(12) United States Patent
Nakura et al.

(10) Patent No.: US 6,244,106 B1
(45) Date of Patent: Jun. 12, 2001

(54) ELECTRICAL POWER CABLE UNDERGROUND LAYING DEPTH MEASURING METHOD

(75) Inventors: Yuji Nakura; Ryosuke Hata; Masayoshi Yamaguchi, all of Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 08/916,200

(22) Filed: Aug. 22, 1997

(30) Foreign Application Priority Data

Aug. 23, 1996 (JP) .................................... 8-324502
Jun. 26, 1997 (JP) .................................... 9-187621

(51) Int. Cl.$^7$ .............................. G01B 21/18; G01J 5/10
(52) U.S. Cl. .................... 73/290 R; 374/131; 374/161
(58) Field of Search .................... 374/137, 161, 374/6, 131, 165; 73/290 R, 293, 295; 356/301

(56) References Cited

U.S. PATENT DOCUMENTS

| 3,955,042 | * | 5/1976 | Kellow et al. | 174/15 |
| 4,327,242 | * | 4/1982 | Saito | 174/11 R |
| 4,621,929 | * | 11/1986 | Phillips | 374/43 |
| 4,767,219 | * | 8/1988 | Bibby | 374/123 |
| 4,823,166 | * | 4/1989 | Hartog | 356/44 |
| 5,178,465 | * | 1/1993 | Amano | 374/131 |

FOREIGN PATENT DOCUMENTS 19509934 10/1995 (DE) .
6-70435 3/1994 (JP) .

OTHER PUBLICATIONS

Derwent Publications Ltd., Abstract of SU 1434–212–A.
J.L. Harper: "Thermal property analyzer for on–site soil analysis" EPRI, 1982, XP002131062.
Database Compendex 'Online! Engineering Information, Inc., New York, NY, US, Smith Richard B et al: "Instrument to monitor temperature and calculate ratings for underground power cables" Database accession No. EIX80090000743, XP 002131063 & Proc of the Isa Conf and Exhib; Oct.22–25, 1979; vol. 34, no part 2, 1979, pp. 45–60,Adv Instrum 1979 ISA.
Database Inspec 'Online! Institute of Electrical Engineers Stevenage, GB, Gyger A et al: "Measurement of cable temperature with optical fibre sensors" Database accession No. 2882785, XP002131064 & Kabel–Cables, Nov. 1986; No. 23, pp. 19–21.

* cited by examiner

*Primary Examiner*—Hezron Williams
*Assistant Examiner*—Michael Cygan
(74) *Attorney, Agent, or Firm*—Pillsbury Winthrop LLP

(57) ABSTRACT

The underground-laying depth of an electric power cable is obtained on the basis of temperature data of the electric power cable laid underground, ambient temperature data of a place where the electric power cable is laid underground, calorific power data of the electric power cable, thermal resistivity of soil where the electric power cable is laid underground, and radiation thermal resistivity of the surface of the electric power cable. The ambient temperature means the temperature of a place which is not influenced by the heat of the electric power cable.

15 Claims, 3 Drawing Sheets

ELECTRICAL POWER CABLE UNDERGROUND LAYING DEPTH MEASURING METHOD

BACKGROUND OF THE INVENTION

1. Field of the Invention

The present invention relates to a method of measuring underground-laying depth of an electric power cable.

2. Description of the Related Art

Most of accidents of electric power cables, particularly of submarine cables, are caused by external injuries by running anchors of ships, fishing instruments such as trawlnets, dredging, or the like. It is therefore essential to lay cables underground at a predetermined depth in order to prevent those injuries. It has been found that the reliability of a cable is improved greatly if the cable is laid underground at a predetermined depth in soil.

Therefore, the following two points are important.

(1) A cable is laid underground at a predetermined depth surely when the cable is laid.

(2) The predetermined underground-laying depth is kept over the whole length of the cable during the service period of the cable.

Of these points, it is relatively easy to lay a cable underground at a predetermined depth surely when the cable is laid, but it is difficult to keep the predetermined laying depth, because the underground-laying depth cannot be kept because of sand movement (sand wave) caused by tides thereafter, changes of submarine topography caused by dredging, and the like. Accordingly, the following problems exist: (A) that the underground-laying depth becomes abnormally shallow so that injury cannot be prevented, and (B) that the underground-laying depth becomes abnormally deep so that the cable temperature nearby increases abnormally (hot spot) to deteriorate the cable.

It is therefore necessary to monitor the underground-laying depth in the longitudinal direction of the cable to make it possible to perform maintenance immediately when abnormality is found.

The conventional technique to measure the underground-laying depth of a submarine cable have been known as follows.

(1) The underground-laying depth is directly measured by a diver.

(2) A magnetic field generated by a cable in a spot is measured while a search coil is moved perpendicularly to the cable, this operation being repeated.

(3) An optical fiber is combined with an electric power cable, and an optical fiber distributed temperature sensor is connected to this optical fiber to measure the temperature distribution along the electric power cable to thereby obtain the underground-laying depth on the basis of the measurement (Unexamined Japanese Patent Publication (kokai) No. Hei-6-70435). That is, the underground-laying depth is measured by a diver or the like in advance after the cable was laid, and the change of the underground-laying depth is detected by comparison with the temperature distribution in the longitudinal direction of the cable when the cable was paid and the temperature distribution when the underground-laying depth is measured.

However, the above-mentioned methods (1) and (2) are difficult to be operated, and cannot always monitor the underground laying depth.

In addition, in the technique (3), it is difficult to detect the underground-laying depth accurately due to the influence of the temperature change of the ocean floor, thermal resistivity or the like of the soil where the cable is laid, and the like.

SUMMARY OF THE INVENTION

It is an object of the present invention to provide a method by which the underground-laying depth of an electric power cable can be measured accurately and can be always monitored.

According to the present invention, the underground-laying depth of an electric power cable is obtained on the basis of temperature data of the electric power cable laid underground, ambient temperature data of a place where the electric power cable is laid underground, calorific power data of the electric power cable, thermal resistivity of soil where the electric power cable is laid underground, and radiation thermal resistivity of the surface of the electric power cable.

According to the method of the present invention, it is possible to monitor the change of the underground-laying depth in the longitudinal direction of an electric power cable accurately during the period of service of the cable. It is therefore possible to perform suitable maintenance if necessary, and it is possible to keep the reliability of the underground-laid electric power cable sufficiently high.

Particularly, by using an optical fiber distributed temperature sensor and combining an optical fiber with both the electric power cable and a spare cable (return cable), or by extending a portion of the optical fiber combined with the electric power cable and disposing the portion in a position enough far away from the electric power cable or near the basal floor, it is possible to obtain the ambient temperature and temperature data of the electric power cable by means of the continuous single optical fiber.

DETAILED DESCRIPTION OF THE INVENTION

Figure 1:
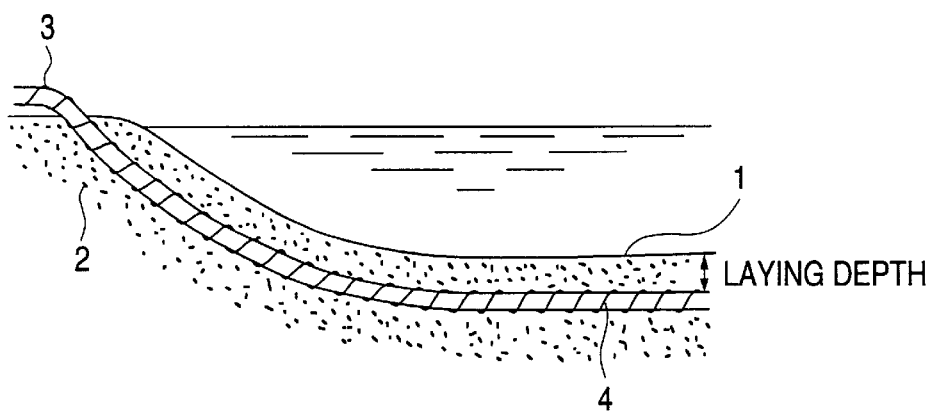
FIG. 1 is an explanatory diagram illustrating the state where a submarine cable is laid.

Detailed description of the present invention will be described as follows.

In the method according to the present invention, the underground-laying depth of an electric power cable is obtained on the basis of temperature data of the electric power cable laid underground, ambient temperature data of a place where the electric power cable is laid underground, calorific power data of the electric power cable, thermal resistivity of soil where the electric power cable is laid underground, and radiation thermal resistivity of the surface of the electric power cable.

Here, the ambient temperature herein means the temperature of a place where there is no heat influence of a cable. Actually, the ambient temperature may be measured at a place in the soil where is considered that there is no heat influence, i.e., a position enough far away from the electric power cable.

By way of the simplest example, assume now a DC cable is used, the temperature data of the outer surface of the cable has been obtained by an optical fiber distributed temperature sensor. Then, if the ambient temperature, the thermal resistivity of soil, the radiation thermal resistivity of the surface of the surface of the electric power cable, the calorific power of a conductor of the electric power cable, and the outer diameter of the cable are known, the underground-laying depth can be calculated on the basis of the respective data in accordance with the following expression.

Expression 1

$$\theta - W = \left( \frac{R \cdot \ln\left(\frac{r+d}{r}\right) + h \cdot \left(\frac{1}{r+d}\right)}{2(r+d)} \right) Q \cdot r^2$$

θ: temperature data of cable outer surface obtained by an optical fiber distributed temperature sensor
W: ambient temperature
R: thermal resistivity of the soil
h: radiation thermal resistivity of the surface on cable surface
Q: calorific power of cable conductor
r: cable outer diameter
d: underground-laying depth In addition, the aging data may be used as any of the temperature data of the electric power cable, the ambient temperature data of the point where the electric power cable is laid underground, the calorific power data of the electric power cable. For example, when an optical fiber is disposed on an anti-corrosive layer of the electric power cable as a sensor for obtaining the temperature data of the cable, the detection temperature of the optical fiber does not change immediately even when the conductor temperature (calorific power) or the ambient temperature of the optical fiber changes, but changes with a time lag based on the coefficients of thermal conductivity of the various constituents from the conductor to the optical fiber. Then, it is possible to measure the underground-laying depth more accurately if the calorific power and the ambient temperature at the time when influence is given on the temperature change of the optical fiber are used.

Preferably, the above-mentioned depth measuring method obtains the underground-laying depth on the basis of known ones of the respective data or others as follows.

(1) When the thermal resistivity of the soil where the electric power cable is laid underground and the radiation thermal resistivity of the surface of the electric power cable are known.

In this case, it is preferable to obtain the underground-laying depth by using the temperature of a spare cable which is generating no heat or the temperature of a return cable as the ambient temperature of the point where the electric power cable is laid underground. The calorific power of the electric power cable may be obtained from the current supplied to the cable and the resistance of a conductor of the electric power cable. Specifically, it is obtained as follows.

(A) When the electric power cable is a DC cable:

A so-called Joule heat loss obtained by the product of the supplied current and the square of the conductor resistance becomes the calorific power of the electric power cable as a whole. The supplied current in this case is measured and obtained at a separate current-supply terminal. The resistance of the conductor is obtained on the basis of the resistivity (or inherent resistivity) caused by the material of the conductor of the electric power cable, the sectional area of the conductor, and the measured temperature of the electric power cable, which are known in advance. If the temperature of the electric power cable is not known, temporary temperature of the electric power cable is obtained on the assumption of various values including the ambient temperature in the above expression, and then those various values are decided by using measured values so that the temporary temperature of the electric cable is replaced by the measured value to thereby obtain the conductor resistance.

(B) When the electric power cable is an AC cable:

As heat generating sources, there are dielectric loss, conductor loss caused by current supply, metal sheath loss, iron wire loss, etc. and the sum of these losses becomes the whole calorific power. Although the details of the ways of obtaining these losses are omitted therein, for example, Japanese Cable Standard No. 168 E (1996) is helpful.

In any of structures which will be described below, the calorific power of an electric power cable can be obtained in the same manner as this.

(2) When the ambient temperature of the point where the electric power cable is laid underground, the underground-laying depth when the electric power cable was laid underground, and the radiation thermal resistivity of the surface of the electric power cable are known:

In this case, first, the calorific power of the electric power cable is obtained on the basis of the current supplied to the cable. Next, the thermal resistivity of the soil where the electric power cable is laid underground is obtained from this calorific power and the three known data. The underground-laying depth of the electric power cable is obtained on the basis of the ambient temperature, the radiation thermal resistivity of the surface of the electric power cable, the calorific power of the electric power cable, the thermal resistivity of the soil, and the temperature data of the electric power cable after current supply.

In each of the above-mentioned methods, it is preferable to use an optical fiber distributed temperature sensor to obtain the temperature data of the electric power cable. That is, an optical fiber is combined with the electric power cable, light is made incident into the optical fiber from one end or opposite ends of the optical fiber, and thereafter, the temperature data in the longitudinal direction of the electric power cable is obtained from the intensity of Raman scattering light contained in the back scattering light.

When an optical fiber is combined with the electric power cable and an optical fiber temperature distribution measuring device is used, the following two ways can be used to measure both the ambient temperature and the electric power cable temperature.

(1) Either one of the following structures is employed by using the temperature of a spare cable which is generating no heat or the temperature of a return cable, as the ambient temperature.

(a) The optical fiber combined with the electric power cable is extended so as to be further combined with the spare cable or the return cable.

(b) Another optical fiber different from the optical fiber combined with the electric power cable is combined with spare cable or the return cable for the purpose of measuring the temperature.

In the case of the former method (a), the ambient temperature and the electric power cable temperature can be measured by a continuous single optical fiber.

(2) The optical fiber is disposed in a position where it can measure the ambient temperature, and either one of the following structures (a) and (b) is employed.

(a) The optical fiber combined with the electric power cable is extended so as to be disposed in a position enough far away from the electric power cable (for example, a position where is not influenced by the heat of the cable).

(b) Another optical fiber different from the optical fiber combined with the electric power cable is disposed in a position enough far away from the electric power cable.

In the case of the former method (a), the ambient temperature and the electric power cable temperature can be measured by a continuous single optical fiber.

Further, when the optical fiber is extended up to a position between a position enough far away from the electric power cable and the electric power cable, the thermal resistivity of the soil can be also obtained. That is, the thermal resistivity of the soil is calculated on the basis of the temperature of the electric power cable, the ambient temperature, and the temperature between the electric power cable and the basal bottom.

Preferred embodiments of the present invention will be described below referring to the accompanying drawings.

FIG. 1 is an explanatory diagram illustrating the state in which a submarine cable is laid. As shown in FIG. 1, and electric power cable 3 is laid in soil 2 of an ocean floor 1. This electric power cable 3 is combined with an optical fiber 4, and provided with, in the order from the center, a conductor with or without an oil channel, an insulating layer, a metal coating such as a lead coating or the like, a reinforcing layer, an anti-corrosive layer, an optical fiber unit stored in a stainless steel pipe or the like, a seat floor layer such as polypropylene (PP) yarn or the like, an armoring wire, and a serving layer such as PP yarn or the like. The structure where an optical fiber is interposed between the anti-corrosive layer and the armoring wire is only an example, and the optical fiber may be disposed in any place in the cable 3.

Figure 2:
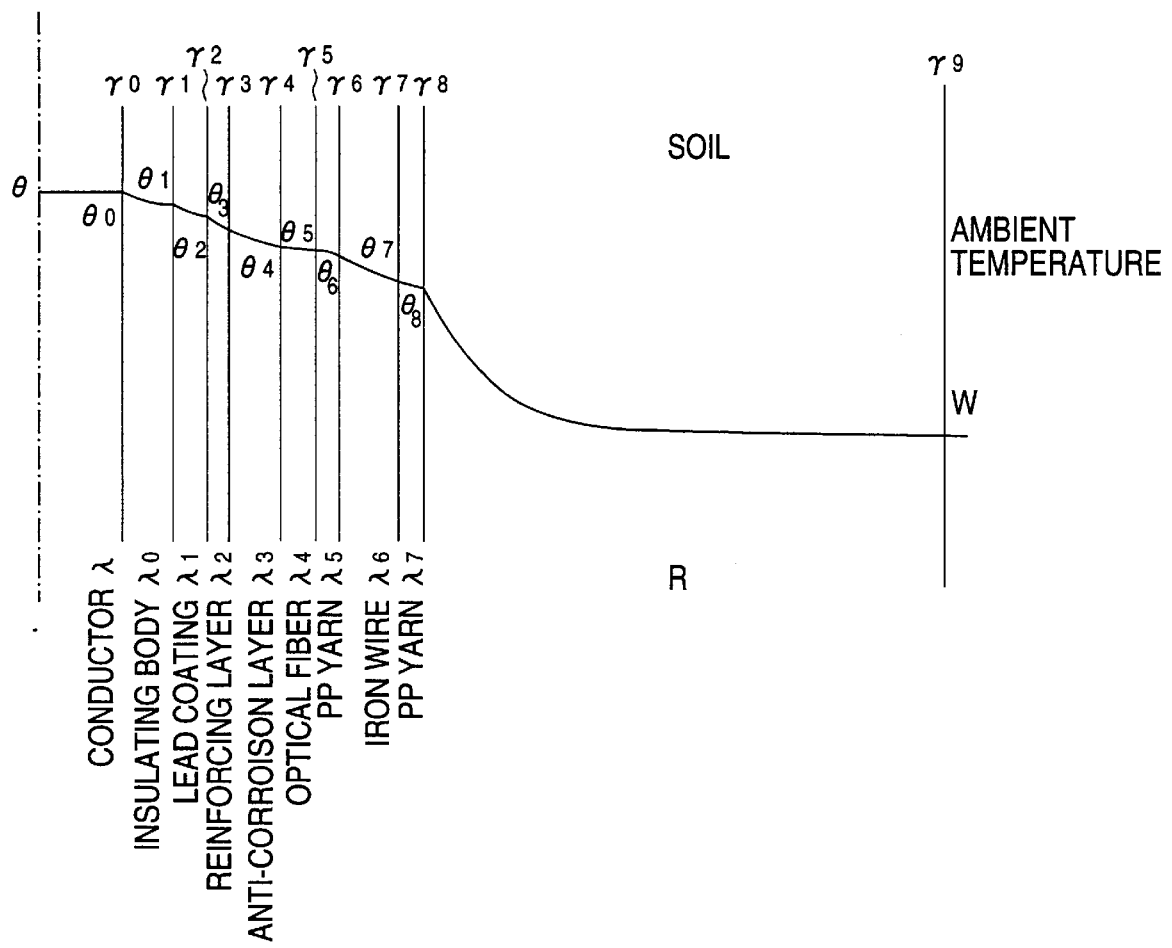
FIG. 2 is a graph showing the temperature distribution from the center of an electric power cable to a base (ocean floor) when an optical fiber is combined with the cable.

The temperature distribution from the cable center toward the base (herein, a place within ocean floor enough far away from the cable) in such an electric power cable 3 is measured as shown in FIG. 2. That is, the temperature is the highest in the conductor portion, decreases as the place goes toward the outer circumference of the cable, and further decreases in the soil reaching from the cable surface to the ocean floor. In FIG. 2, $r_0$ to $r_9$ designate the distances from the cable center to respective cable constituents or the base, $\theta_0$ to $\theta_8$ designate the surface temperature of the respective cable constituents, $\lambda$ to $\lambda_7$ designate the thermal resistances of the respective constituents obtained in the basis of the thermal conductivity of the cable constituents or thermal resistances of the respective constituents or the distance at each point, R designates the thermal resistivity of the soil, and w designates the ambient temperature.

Then, temperature at a place of the cable is measured, and the temperature of the outer surface of the cable is obtained on the basis of this temperature data to thereby obtain the underground-laying depth. Specifically, it is calculated by the "Expression 1".

Then, the cable outer diameter r and the radiation thermal resistivity of the surface h on the surface of the electric power cable are generally known, and calorific power of the electric power cable 3 can be also obtained easily from a current supplied thereto and conductor resistance. In addition, preferably, the temperature data θ of the electric power cable laid underground is obtained by using a optical fiber distributed temperature sensor (not-shown in FIG. 1). This is a sensor in which light pulses are radiated into an optical fiber 4 combined with the electric power cable 3, and the temperature distribution along the optical fiber is obtained from the intensity of Raman scattering light contained in the back scattering light. When an optical fiber is provided, for example, between the anti-corrosive layer and the PP yarn ($\lambda_5$) as shown in FIG. 2, and the temperature in this portion is measured, the temperature data θ may be obtained by the following operations.

| PP yarn surface temperature | $\theta_6 = \theta_5$ (measured value)-$\lambda_5 \times Q$ |
| armoring wire surface temperature | $\theta_7 = \theta_6 = \lambda_6 \times Q$ |
| PP yarn surface temperature | $\theta_8 = \theta_7 = \lambda_7 \times Q$ |

This value $\theta_8$ designates the temperature of the cable outer surface, so that θ may be replaced by $\theta_8$ in the above-mentioned Expression 1. Measurement of the temperature of the electric power cable 3 may be performed with a number of spot-type sensors such as thermo-couples (not-shown) or the like, disposed along the cable.

Accordingly, if the other data, that is, the thermal resistivity R of the soil where the electric power cable is laid and the ambient temperature w at the point where the electric power cable is laid underground are found, the underground-laying depth can be obtained.

First, the case where the thermal resistivity R of the soil is known while the ambient temperature w is known yet will be described. An estimated value or a measured value measured separately is used as the thermal resistivity R of the soil.

Figure 3:
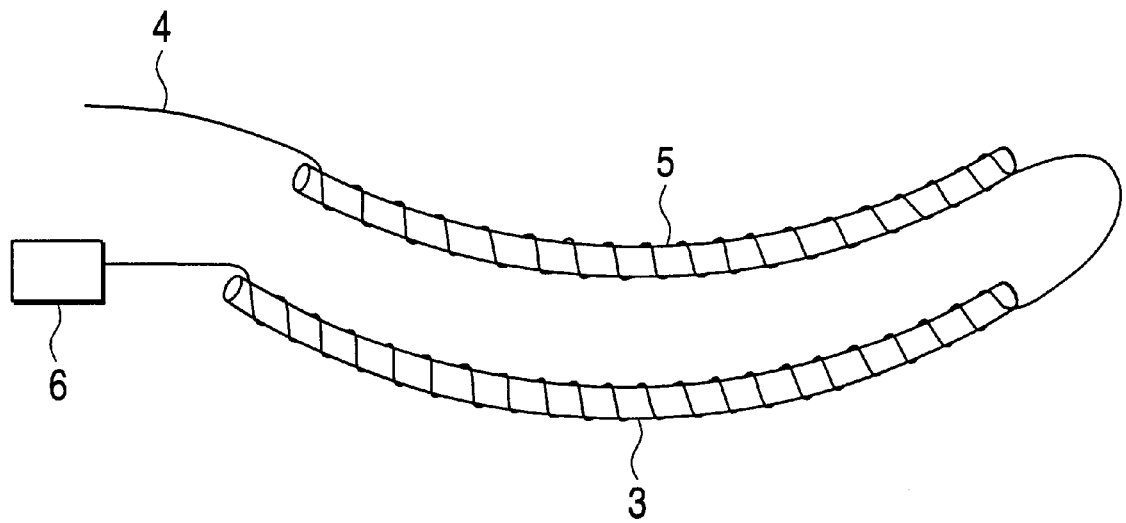
FIG. 3 is an explanatory diagram illustrating the state where an optical fiber is combined with an electric power cable and a spare cable.

In this case, a spare cable which is generating no heat is used for obtaining the ambient temperature. FIG. 3 is an explanatory diagram of an embodiment using a spare cable 5. Generally, the spare cable 5 is disposed at an enough distance from the electric power cable 3 (cable to be measured), and laid underground in the same manner as the cable 3. A optical fiber distributed temperature sensor 6 is connected to one end of the optical fiber 4 combined with the electric power cable 3, and this optical fiber 4 is further extended and combined also with the spare cable 5. That is, the temperature distributions of both the electric power cable 3 and the spare cable 5 are measured by the continuous single optical fiber. The temperature of the spare cable is used as the ambient temperature w. Because the spare cable per se generates no heat, and is usually disposed at a place with no influence of the heat generated by the electric power cable 3, the temperature of the spare cable may be often regarded as the ambient temperature w with no problem. As for whether the distance between the electric power cable and the spare cable is sufficient or not, the distance is sufficient if it can be confirmed that the temperature of the spare cable 5 does not increase while a current is supplied to the electric power cable.

As the spare cable 5, a cable which is always supplied with no current, or a cable which does not generate any heat when no current is supplied thereto though a current is temporarily supplied thereto may be used. Besides, a return cable is also used instead of the spare cable 5. In addition, the structure where the optical fiber 4 is combined with the spare cable 5 or the return cable may have any configuration.

Data obtained by the above structure (the cable outer diameter r, the temperature data θ of the electric power cable, the ambient temperature w, the calorific power Q of the electric power cable, the thermal resistivity R of the soil, and the radiation thermal resistivity of the surface h on the surface of the electric power cable) is substituted into the above-mentioned expression 1 to obtain the underground-laying depth.

Figure 4:
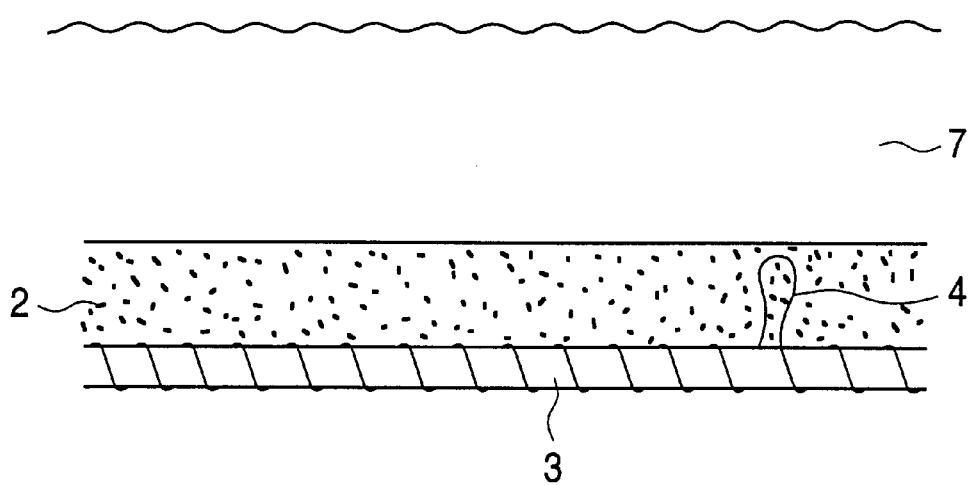
FIG. 4 is an explanatory diagram illustrating the state where a portion of an optical fiber combined with an electric power cable is extended and disposed just under the base.

Next, a structure different from that of FIG. 3 for obtaining the ambient temperature w is shown in FIG. 4.

In this structure, a spare cable is not used, and a portion of the optical fiber 4 combined with the electric power cable 3 is extended so as to be disposed in a position enough far away from the electric power cable 3. Preferably, this extended optical fiber 4 is disposed underground enough far away from the electric power cable 3 in the soil 2 very close to the ocean floor or in the sea 7 very close to the ocean floor. With such a structure, by the continuous single optical fiber, the ambient temperature w is obtained in the extended portion of the optical fiber 4, and the temperature data θ along the cable is obtained in the portion where the optical fiber 4 is combined with the electric power cable. The underground-laying depth is calculated in the same manner as in the structure of FIG. 3. Particularly, if a number of such extended portions of the optical fiber 4 are provided in advance at suitable intervals in the longitudinal direction of the electric power cable, it is possible to monitor the underground-laying depth almost continuously over the cable longitudinal direction with a high accuracy.

Next, the case where the initial underground-laying depth when the cable was laid underground and the ambient temperature data after the cable was laid underground is known, while the thermal resistivity R of the soil is not known will be described. An estimated value or a measured value measured separately is used as the above-mentioned ambient temperature data. Needless to say, this ambient temperature may be obtained in advance by such a structure as shown in FIG. 3 or 4.

The initial underground-laying depth when the cable was laid underground is often known on the specifications of application. If the underground-laying depth when the cable was laid underground and the ambient temperature are known, the thermal resistivity of the soil can be obtained from those known data and the calorific power of the cable when a current is supplied to the cable. Then, the thermal resistivity of the soil when the cable was laid underground and the thermal resistivity of the soil when the underground-laying depth is measured thereafter may be regarded as the same. The underground-laying depth of the electric power cable can be calculated from the above-mentioned expression on the basis of the obtained thermal resistivity of the soil, the ambient temperature data when the laying depth is measured, and the temperature data of the electric power cable.

Although the above description was performed upon the measurement of the underground-laying depth of a submarine cable, the present invention can be applied also to the measurement of the depth of an electric power cable laid underground on land.

Figure 5:
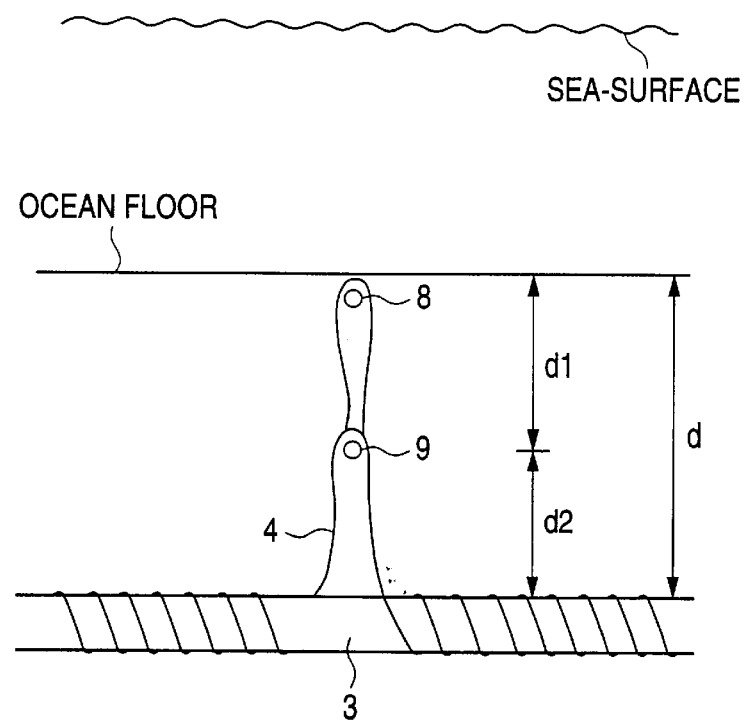
FIG. 5 is an explanatory diagram illustrating the state where a portion of an optical fiber combined with an electric power cable is extended and disposed just under the base and in an intermediate position between the position just under the base and the electric power cable.

Next, a structure in which a portion of the optical fiber combined with the electric power cable is extended not only near the ocean floor but also between the ocean floor and the electric power cable is shown in FIG. 5. In this structure, the thermal resistivity of the soil can be also obtained.

As shown in FIG. 5, a measurement point 8 is disposed near the ocean floor, and a measurement point 9 is disposed between the electric power cable 3 and the measurement point 8. Although each of the measurement points 8 and 9 is illustrated like a spot herein, it is preferable to keep a certain distance from the cable so that each of the measurement points 8 and 9 is not influenced by the heat of the cable. Preferably, the measurement point 8 is disposed in a position enough far away from the electric power cable 3 to have no influence of heat generated by the electric power cable 3, for example, near the basal floor, while the measurement point 9 is disposed in a position between the measurement point 8 and the electric power cable 3 having influence of heat generated by the electric power cable 3.

The temperatures w and w' of the two measurement points 8 and 9 are both constant and show the ambient temperature when the electric power cable 3 is not supplied with current. When a current starts to be supplied to the electric power cable, the temperature w of the measurement point 8 does not change, while the temperature w' of the measurement point 9 increases by the influence of heat which is generated and released from the electric power cable 3, and finally reaches a constant temperature. Then, the temperature θ of the electric power cable 3, the temperature w at the measurement point 8 and the temperature w' at the measurement point 9 have the following relationship.

$$\theta > w' > w$$

Since the underground-laying depth d of the electric power cable and the underground-laying depth d1 at the measurement point 9 were measured and hence known when the cable was laid, the distance d2 between the electric power cable 3 and the measurement point 9 can be obtained by d−d1. Accordingly, the thermal resistivity of the soil can be obtained by the above-mentioned expression if these distances d, d1 and d2, the temperature w at the measurement point 8, the temperature w' at the measurement point 9, and the temperature θ and the calorific power Q of the electric power cable 3 (the way of obtaining the values θ and Q was described above) are known.

Further, in either of the above-mentioned measuring methods, the underground-laying depth can be measured more accurately if aging is taken into consideration upon the temperature data of the electric power cable, the calorific power of the electric power cable, and the ambient temperature data at the point where the electric power cable is laid underground.

When the temperature (calorific power) of the conductor changes in accordance with the change of a value of a current supplied to the electric power cable, the temperature of the optical fiber does not change immediately in accordance with the change of the calorific power, but changes with a time leg based on the coefficients of thermal conductivity of the various constituents from the conductor to the optical fiber. The same thing can be said to the influence of the ambient temperature on the detection temperature of the optical fiber.

Figure 6:
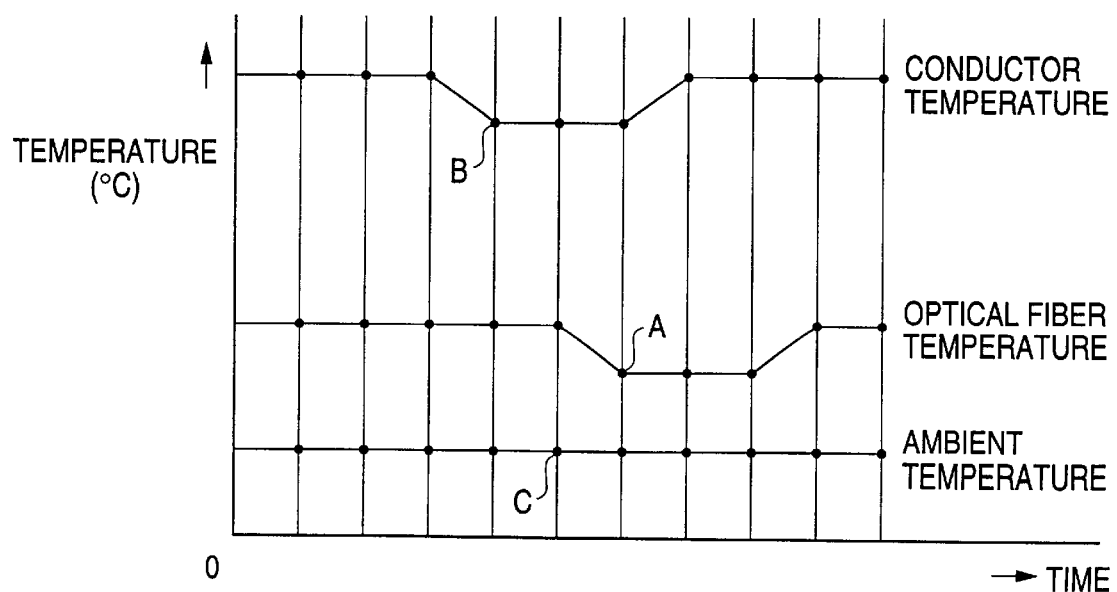
FIG. 6 is an explanatory diagram of a method according to the present invention, in which aging is taken into consideration.

Therefore, for example, when the underground-laying depth at a point A based on the optical fiber temperature (temperature data of the electric power cable) is measured as shown in FIG. 6, the calorific power data (at a point B) of the conductor at the previous time of giving influence on the temperature of the optical fiber and the ambient temperature data (at a point C) are used. Specifically, it can be noted that an average value for a fixed period before the time to obtain the underground-laying depth is used, or a weighted average value (the smaller the weighting, the larger the time lag) in which a time lag is taken into consideration is used.

What is claimed is:

1. An electric power cable underground-laying depth measuring method comprising the steps of:

obtaining temperature data of said electric power cable laid underground;

obtaining ambient temperature data of a place where said electric power cable is laid underground;

obtaining calorific power data of said electric power cable;

obtaining thermal resistivity of soil where said electric power cable is laid underground; and obtaining radiation thermal resistivity of the surface on the surface of said electric power cable;

wherein the underground-laying depth of an electric power cable is obtained on the basis of thus obtained temperature data, ambient temperature data, calorific power data, thermal resistivity, and radiation thermal resistivity of the surface.

2. The electric power cable underground-laying depth measuring method according to claim 1, wherein when said thermal resistivity of soil and said radiation thermal resistivity of the surface on the surface of said electric power cable are already known, temperature of a spare cable which is generating no heat, or temperature of a return cable is regarded as said ambient temperature;

calorific power of said electric power cable is obtained from a supplied current; and the underground-laying depth of said electric power cable is obtained on the basis of said thermal resistivity of soil, said radiation thermal resistivity of the surface on the surface of said electric power cable, said temperature of a spare cable, said ambient temperature, and temperature data of said electric power cable after current supply.

3. The electric power cable underground-laying depth measuring method according to claim 1, wherein when said ambient temperature, an underground-laying depth at a time of laying the electric power cable, and said radiation thermal resistivity of the surface on the surface of said electric power cable are already-known, calorific power of said electric power cable is obtained from a supplied current;

thermal resistivity of soil where said electric power cable is laid underground is obtained from said ambient temperature, said underground-laying depth, said radiation thermal resistivity of the surface on the surface of said electric power cable, and said calorific power; and underground-laying depth of said electric power cable is obtained on the basis of said ambient temperature, said radiation thermal resistivity of the surface of said electric power cable, said calorific power of said electric power cable, said calorific power of said electric power cable, said thermal resistivity of said soil, and temperature data of said electric power cable after current supply.

4. The electric power cable underground-laying depth measuring method according to claim 1, wherein an optical fiber is combined with said electric power cable, and light is made incident to said optical fiber from its one end or its opposite ends to obtain temperature data in the longitudinal direction of said electric power cable from intensity of Raman scattering light contained in back scattering light.

5. The electric power cable underground-laying depth measuring method according to claim 2, wherein an optical fiber is combined with said electric power cable, and light is made incident to said optical fiber from its one end or its opposite ends to obtain temperature data in the longitudinal direction of said electric power cable from intensity of Raman scattering light contained in back scattering light.

6. The electric power cable underground-laying depth measuring method according to claim 3, wherein an optical fiber is combined with said electric power cable, and light is made incident to said optical fiber from its one end or its opposite ends to obtain temperature data in the longitudinal direction of said electric power cable from intensity of Raman scattering light contained in back scattering light.

7. The electric power cable underground-laying depth measuring method according to claim 2, wherein an optical fiber is combined with said electric power cable, and said optical fiber is extended and further combined with said spare cable or said return cable; and light is made incident to said optical fiber from its one end or its opposite ends to obtain temperature data in the longitudinal direction of said electric power cable and ambient temperature from intensity of Raman scattering light contained in back scattering light.

8. The electric power cable underground-laying depth measuring method according to claim 1, wherein an optical fiber is combined with said electric power cable, and said optical fiber is extended up to a position far enough away from said electric power cable so to be substantially unaffected by said electric power cable; and light is made incident to said optical fiber from its one end or its opposite ends so as to obtain temperature data in the longitudinal direction of said electric power cable and ambient temperature from intensity of Raman scattering light contained in back scattering light.

9. The electric power cable underground-laying depth measuring method according to claim 3, wherein an optical fiber is combined with said electric power cable, and said optical fiber is extended up to a position far enough away from said electric power cable so to be substantially unaffected by said electric power cable; and light is made incident to said optical fiber from its one end or its opposite ends so as to obtain temperature data in the longitudinal direction of said electric power cable and ambient temperature from intensity of Raman scattering light contained in back scattering light.

10. The electric power cable underground-laying depth measuring method according to claim 1, wherein an optical fiber is combined with said electric power cable, and said optical fiber is extended up to a position between a position far enough away from said electric power cable so to be substantially unaffected by said electric power cable and said electric power cable; and light is made incident to said optical fiber from its one end or its opposite ends to obtain temperature data in the longitudinal direction of said electric power cable and ambient temperature from intensity of Raman scattering light contained in back scattering light, and further obtain thermal resistivity of soil.

11. The electric power cable underground-laying depth measuring method according to claim 3, wherein an optical fiber is combined with said electric power cable, and said optical fiber is extended up to a position between a position far enough away from said electric power cable so to be substantially unaffected by said electric power cable and said electric power cable; and light is made incident to said optical fiber and from its one end or its opposite ends to obtain temperature data in the longitudinal direction of said electric power cable and ambient temperature from intensity of Raman scattering light contained in back scattering light, and further obtain thermal resistivity of soil.

12. A method for measuring the underground-laying depth of an electric power cable comprising the steps of:

when ambient temperature of a place where said electric power cable is laid, an underground-laying depth at a time of laying the electric power cable, and radiation thermal resistivity of the surface of said electric power cable are already-known, obtaining temperature data of said electric power cable laid underground;

obtaining calorific power data of said electric power cable from a supplied current;

obtaining thermal resistivity of soil where said electric power cable is laid from said ambient temperature, said known underground-laying depth, said radiation thermal resistivity of the surface of said electric power cable, and said calorific power;

the underground-laying depth of an electric power cable is thus obtained on the basis of the temperature data of said electric power cable, ambient temperature, calorific power data, thermal resistivity, and the radiation thermal resistivity of the surface.

13. An electric power cable underground-laying depth measuring method according to claim 12, wherein the temperature data of said electric power cable is obtained from an optical fiber that is combined with said electric power cable, and light is made incident to said optical fiber from its one end or its opposite ends to obtain temperature data from intensity of Raman scattering light contained in back scattering light.

14. An electric power cable underground-laying depth measuring method according to claim 12, wherein the temperature data of said electric power cable is obtained by an optical fiber combined with said electric power cable, and said optical fiber is extended up to a position far enough away from said electric power cable so to be substantially unaffected by said electric power cable; and light is made incident to said optical fiber from its one end or its opposite ends so as to obtain data in the longitudinal direction of said electric power cable from intensity of Raman scattering light contained in back scattering light.

15. An electric power cable underground-laying depth measuring method according to claim 12, wherein the temperature data of said electric power cable is obtained from an optical fiber that is combined with said electric power cable, and said optical fiber is extended up to a position between a position far enough away from said electric power cable so to be substantially unaffected by said electric power cable; and light is made incident to said optical fiber from its one end or its opposite ends to obtain temperature data in the longitudinal direction of said electric power from intensity of Raman scattering light contained in back scattering light, and further obtain thermal resistivity of soil.

* * * * *